(12) United States Patent
Kuo et al.

(10) Patent No.: US 6,947,178 B2
(45) Date of Patent: Sep. 20, 2005

(54) DE-SCREENING HALFTONES USING SIGMA FILTERS

(75) Inventors: Chungkui Kuo, Minneapolis, MN (US); Ravishankar Rao, Plainsford, NY (US); Gerhard R. Thompson, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 09/791,653

(22) Filed: Feb. 26, 2001

(65) Prior Publication Data

US 2002/0154339 A1 Oct. 24, 2002

(51) Int. Cl.[7] ............................................. H04N 1/405
(52) U.S. Cl. ...................... 358/3.08; 382/260; 382/264
(58) Field of Search ................................ 382/260, 261, 382/262, 264; 358/3.08

(56) References Cited

U.S. PATENT DOCUMENTS

| | | | | |
|---|---|---|---|---|
| 4,777,620 A | * | 10/1988 | Shimoni et al. | ............ 382/233 |
| 5,243,444 A | * | 9/1993 | Fan | ............................. 358/3.08 |
| 5,247,588 A | * | 9/1993 | Komatsu | ..................... 382/263 |
| 5,351,314 A | * | 9/1994 | Vaezi | .......................... 382/264 |
| 5,359,676 A | * | 10/1994 | Fan | ............................. 382/246 |

\* cited by examiner

*Primary Examiner*—Thomas D. Lee
(74) *Attorney, Agent, or Firm*—Whitham, Curtis & Christofferson, P.C.; Stephen C. Kaufman

(57) ABSTRACT

A digital imaging system and method uses a two-stage sigma filter to de-screen color images. This filter does not assume any a priori knowledge about the screening process using to produce the halftone image. The two-stage sigma filter may therefore be used to convert color halftone images into continuous-tone images irrespective of the screening process used. The two-stage sigma filter may be constructed, or emulated in software, using an O (N) algorithm which performs smoothing and preserves edge information simultaneously in the Red/Green/Blue color space. This system and method outperforms conventional approaches which, for example, use a Gaussian blur, because it satisfies the dual criteria of completely eliminating halftone screens while preserving edge information. When combined with halftone segmentation techniques, a complete document processing algorithm for gray-scale and color documents is created.

9 Claims, 8 Drawing Sheets

| 0.0011 | 0.0035 | 0.0072 | 0.0091 | 0.0072 | 0.0035 | 0.0011 | 0.0327 |
|--------|--------|--------|--------|--------|--------|--------|--------|
| 0.0035 | 0.0115 | 0.0237 | 0.0301 | 0.0237 | 0.0115 | 0.0035 | 0.1075 |
| 0.0072 | 0.0237 | 0.0485 | 0.0616 | 0.0485 | 0.0237 | 0.0072 | 0.2204 |
| 0.0091 | 0.0301 | 0.0616 | 0.0782 | 0.0616 | 0.0301 | 0.0091 | 0.2798 |
| 0.0072 | 0.0237 | 0.0485 | 0.0616 | 0.0485 | 0.0237 | 0.0072 | 0.2204 |
| 0.0035 | 0.0115 | 0.0237 | 0.0301 | 0.0237 | 0.0115 | 0.0035 | 0.1075 |
| 0.0011 | 0.0035 | 0.0072 | 0.0091 | 0.0072 | 0.0035 | 0.0011 | 0.0327 |

FIG. 8

DE-SCREENING HALFTONES USING SIGMA FILTERS

BACKGROUND OF THE INVENTION

1. Field of the Invention

This invention relates to the field of digital printing and imaging, and more particularly to a system and method for reproducing digitized documents such as books, periodicals, and other written materials.

2. Description of the Related Art

One important application of digital imaging technology is the conversion of books and printed material into an electronic form suitable for reading, archival, and transmittal. An example of such an application is printing books-on-demand, a new technology that is revolutionizing the book printing and publishing industry. Instead of printing thousands of copies of a book and then storing and distributing each copy, publishers can create a digital version of the book and print an exact number of desired copies. This solution is highly desirable because it eliminates inventory costs and the need to forecast expected demand for a book. Furthermore, books can never go out of print using this technology as their digital versions can persist indefinitely.

Presently, a significant number of books exist for which there is no available digital version. For reading and archival purposes, these books must be converted to digital form using a scanning process. Printed documents usually consist of text regions and image regions. The image regions are printed by converting continuous-tone originals into halftone images using a screening process. An overview of several conventional screening (or halftoning) processes is provided in the text, R. Ulichney, "Digital Halftoning," MIT Press, Cambridge, Mass., 1987.

In order to recover the original continuous-tone image from the scanned halftone image, a process known as de-screening (or inverse halftoning) is used. A number of conventional gray-scale, halftone de-screening techniques are disclosed, for example, in Jaimes et al., "Segmentation and Automatic Descreening of Scanned Documents," SPIE, Volume 3648, pages 517–518, 1999, and Luo et al., "A Robust Technique for Image De-Screening Based on the Wavelet Transform," IEEE Transaction on Signal Processing, Volume 46, No. 4, pages 1179–1184, 1998.

If scanned halftoned images are printed without de-screening, moire patterns may be produced which degrade the quality of the reproduced document. Even though moire patterns are less likely to appear in other printing processes (e.g., error-diffusion halftone and stochastic halftoning algorithms), transforming a halftone image into a continuous-tone image is desirable for future image manipulation processes such as image compression and scaling. A common technique, therefore, is to segment a document into text and halftone regions, respectively, and apply a de-screening technique to the halftone regions. See, for example, Dunn et al., "Extracting Halftones from Printed Documents Using Texture Analysis," Optical Engineering, Volume 36, No. 4, pages 1044–1052, 1997. De-screening is therefore desirable because it prevents moire patterns from appearing in the reproduced halftone image.

The most direct de-screening approach is to apply a low-pass filter to the halftone image. See, for example, Hein et al., "Halftone to Continuous-Tone Conversion of Error-Diffusion Coded Images," IEEE Transactions on Image Processing, Volume 4, No. 2, 1995. This approach is designed for the error-diffusion halftoning process which does not employ a screening process and thus is difficult to apply for de-screening images generated by repetitive screens.

Another approach to de-screening, known as the wavelet-based approach, has been said to be applicable regardless of the screening (halftoning) process used. However, because wavelet algorithms involve down-sampling and up-sampling steps, moire patterns might appear which would inevitably deteriorate the quality of the reconstructed image. The wavelet method has not been successfully tested on halftone samples generated by screening processes.

Techniques for de-screening color halftone images are known in the prior art. These techniques typically use a smoothing filter, such as a Gaussian blur, to convert a halftone image into a continuous-tone image. A shortcoming of such filtering is that the blur not only removes the screen, but also degrades desirable image properties such as sharpness of edges and image detail.

In an attempt to overcome these two conflicting goals, conventional systems have employed an approach based on anisotropic diffusion and total variation minimization to generate piecewise smooth gray scale images. See, for example, Blomgren et al., "Total Variation Image Restoration: Numerical Methods and Extension," IEEE Image Processing, Volume 3, pages 384–387, 1997. This approach, however, has proven unacceptable in many instances. Attempts to generalize these to color spaces have shown unsatisfactory performance.

More specifically, one of the problems with this approach is that a processed image becomes near-graphic in the sense that the image appears to have posterization effects, where there are large areas of uniform color. Although edge information is preserved, and even enhanced, the visual quality is often objectionable. To improve visual quality, many prefer the slightly blurred image produced by the blindly applied low-pass filter.

A need therefore exists for an improved method for de-screening halftone images, and more specifically a method which converts a halftone image into a continuous-tone image that exhibits less degradation of edges and image detail.

SUMMARY OF THE INVENTION

It is one object of the present invention to provide an improved system and method for de-screening color images of virtually any type.

It is another object of the present invention to achieve the aforementioned object by de-screening using a sigma filter which does not assume a priori knowledge about the type of halftoning process used to produce the image.

It is another object of the present invention to provide a system and method for converting a halftone image into a continuous-tone image that exhibits less degradation of edges and image detail.

It is another object of the present invention to adapt a system and method of the aforementioned type to convert books, periodicals, and other printed materials into digital form, thereby improving upon the comparatively slower manual processes which have been conventionally employed.

The foregoing and other objects of the invention are achieved by de-screening a color image using a two-stage, color sigma filter which, similar to the anisotropic diffusion algorithm and total variation minimization techniques designed for gray scale images, is implemented as an O(N) algorithm which smooths out halftone dots while preserving edge information in the red/green/blue (RGB) color space. More specifically, the present invention combines a low-pass filter with the aforesaid color sigma filter, and generates de-screened images which appear piecewise smooth with edges preserved. The system and method of the present invention is applicable to any inverse halftoning process, as well as gray scale and color halftone images, because no assumption is made regarding the halftoning process used to produce the image. Further, the present invention satisfies the dual criteria of eliminating halftone screens while preserving edge information. When combined with halftone segmentation techniques, a complete document processing algorithm for gray-scale and color documents may advantageously be created.

BRIEF DESCRIPTION OF THE DRAWINGS

FIG. 8 is a table of filter coefficients which may be used in accordance with the present invention.

DESCRIPTION OF THE PREFERRED EMBODIMENTS

The present invention is a system and method which de-screens a halftone image into a continuous-tone image with improved quality compared with those generated by conventional de-screening methods. The present invention achieves this improved quality by using a unique two-staged filter which includes a smoothing filter connected to a sigma filter.

More specifically, simply applying a conventional sigma filter to de-screen halftone images has proven undesirable, as the sigma filter will preserve the discontinuities arising from halftone dots. The present invention overcomes this problem using its two-stage sigma filter, i.e., by coupling a smoothing filter (e.g., a low-pass filter) with a sigma filter. Instead of selecting pixels based on raw halftone image values, as is conventionally done, a low-pass filtered image $f_1(x,y)$ is first generated. Pixels belonging to the same class as the center pixel in the low pass filtered image $f_1(x,y)$ are then selected based on an estimated filter parameter s. With this arrangement, the above-described problem can be avoided. While the present method is especially well suited to de-screening color halftone images, those skilled in the art can appreciate that gray-scale halftone images may also be de-screened in accordance with the invention.

Figure 1:
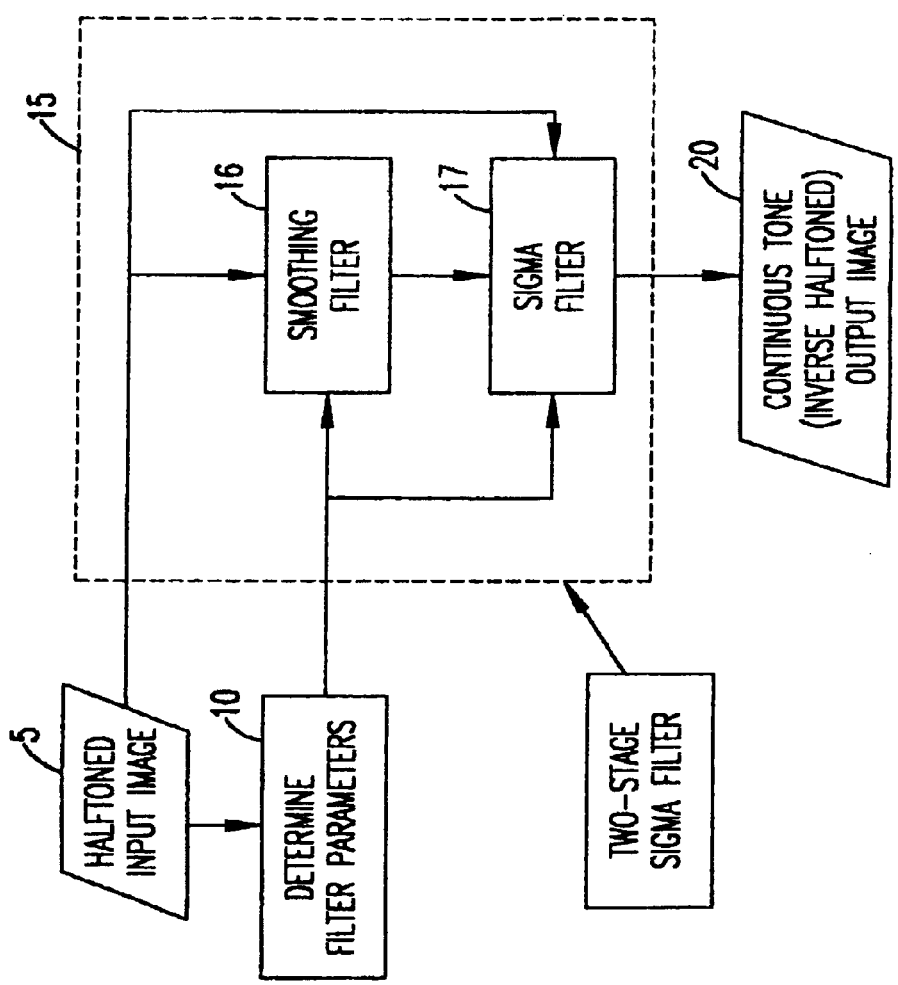
FIG. 1 is a block diagram of a preferred embodiment of the system of the present invention for de-screening a halftone image.

Referring to FIG. 1, a preferred embodiment of the system of the present invention includes an image input device 5, an image analyzer 10, a two-stage filter 15, and an image output device 20. The image analyzer analyzes the halftone image to define parameters which are used by the two-stage sigma filter for converting the halftone image into a continuous-tone image. The two-stage sigma filter includes a smoothing filter 16, which is preferably a low-pass filter, connected to a sigma filter 17. The image input device is connected to both filters to facilitate the image processing steps included in the method of the present invention.

The method of the present invention produces a continuous-tone image with improved quality based on its two-stage sigma filter design and the manner in which it is implemented.

De-Screening Filter Design

Figure 2:
FIG. 2 shows a Fourier power spectrum of a grayscale halftone image.
Figure 3:
FIG. 3 shows a Fourier power spectrum of a color halftone image.

Before continuing with a description of the invention, effects introduced by a halftone screening process are first discussed, where magnitudes of a two-dimensional Fourier transform of a gray-scale halftone image and a color halftone image are shown in FIGS. 2 and 3, respectively. Because of the existence of three-channels (red, green, blue) for a color image, FIG. 3 is obtained by taking a two-dimensional Fourier transform of the red channel only. In FIG. 2 it can be seen that the screening angle and local maxima in the spatial frequency domain are well defined for the gray scale halftone image. The screening angle in FIG. 2 is 45 degrees, which is commonly used because the human visual system is least sensitive to this angle. However, because of the overlap of four different kinds of ink, namely cyan, yellow, magenta, and black, a rosette pattern is produced on a color halftone image and consequently appears in all of the three color channels. Therefore, less pronounced peaks in the spatial frequency domain are distributed in an isotropic manner as seen in FIG. 3.

Two-Stage Sigma Filter Design

Figure 4:
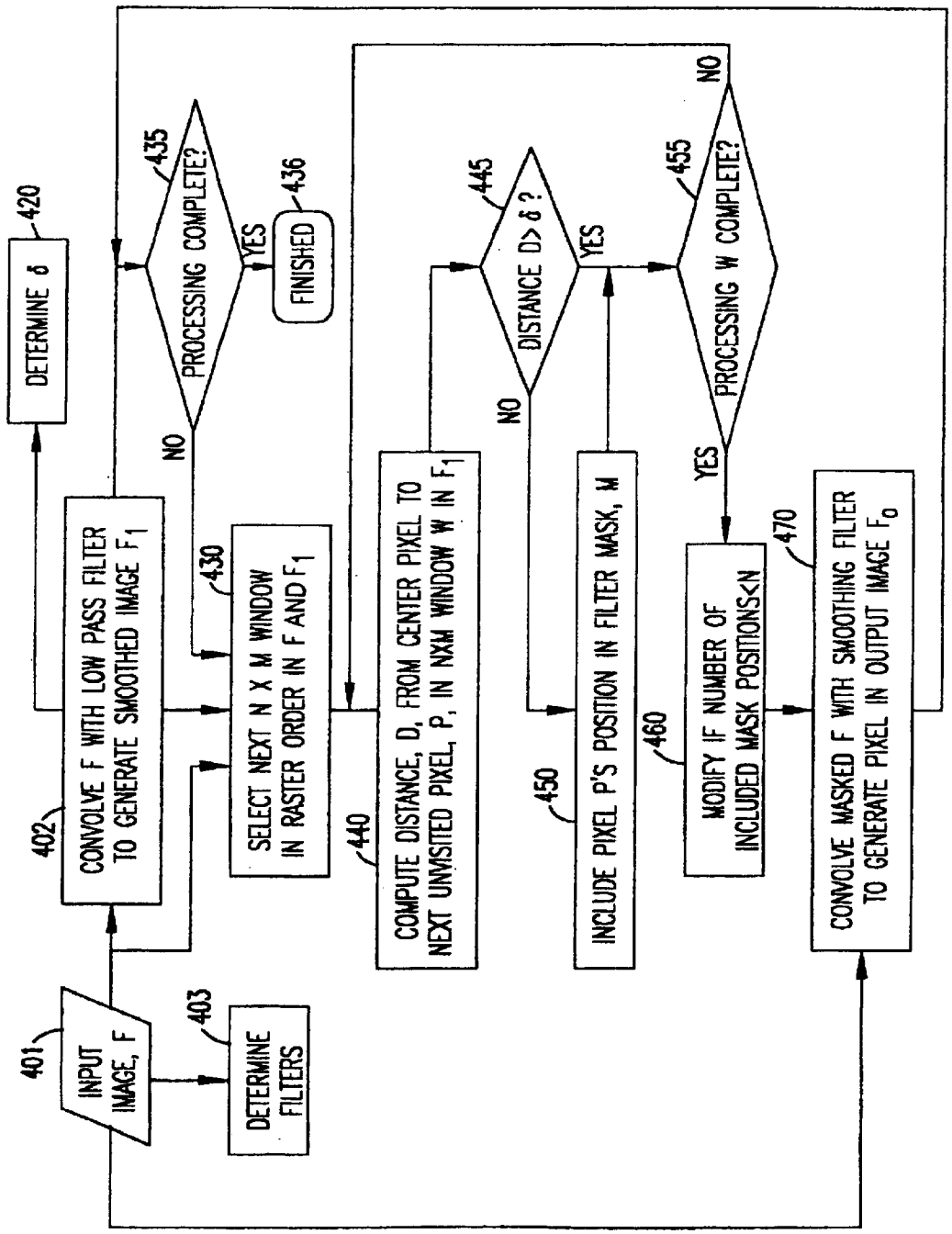
FIG. 4 is a flow diagram showing steps included in a preferred embodiment of the method of the present invention for de-screening halftone images.
Figure 5A:
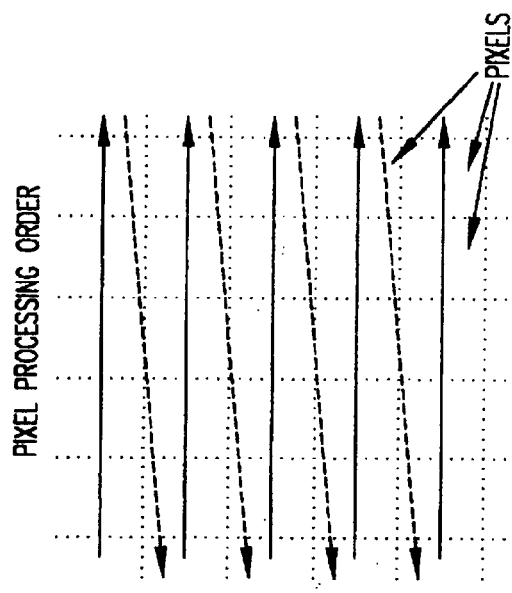
FIG. 5(a) is a diagram showing an order of processing pixels in accordance with the present invention.

A sigma filter is based on a model of an image as $f(x,y)+n(x,y)$, where $f(x,y)$ represents clean image data and $n(x,y)$ corresponds to a noise component of the image. The process of estimating the parameters of the sigma filter will now be described. As shown in FIG. 4, an intermediate smoothed image, $f_1$ 402, is generated using an n×m sized smoothing filter on the original halftone image 401. The order of processing pixels in the original image is shown in FIG. 5(a). The n×m window is moved from one pixel to the next in raster order, as shown in FIGS. 5(b) and (c). For specificity, a 7×7 window is illustrated in the figure.

From the image $f_1$, we now estimate a threshold value ($\delta$) as $\delta=2\sigma$ where $\delta$ is defined in equation (1) and $\sigma$ is a variable introduced for notational convenience, and is proportional to the standard deviation of the smoothed input image in the neighborhood of the edge pixels as explained. In accordance with one embodiment of the invention, this threshold value is estimated by first locating edge points in the image $f_1$, which can be done using operators such as the Canny edge operator or the Sobel edge operator, known to those familiar with the state of the art. We then calculate the local standard deviation $\delta_n$ in terms of color (RGB) values for pixels surrounding each edge point, say within an N×M window centered on the edge point, e.g. a 7×7 window. (In the symbol $\delta_n$, the n indexes the edge points). This process is repeated for each edge point in the image $f_1$. The sequence of standard deviations $\{\delta_n\}$ for all edge points is then sorted and $\delta$ is calculated by the following rule:

$$\delta = \min\{\delta_1 | \delta_1 \geq 0.1 * \max\{\delta_1\}\} \quad (1)$$

This rule captures the statistics of regions that surround edge pixels in the image so that smoothing across edges can be subsequently avoided. The processing steps just described constitute box 420 in FIG. 4.

Figure 5C:
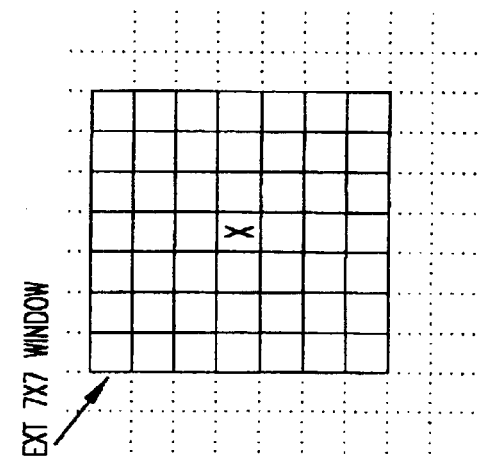
FIGS. 5(b) and 5(c) show how a window is shifted throughout a halftone image as it is being processed in accordance with the present invention.
Figure 5B:
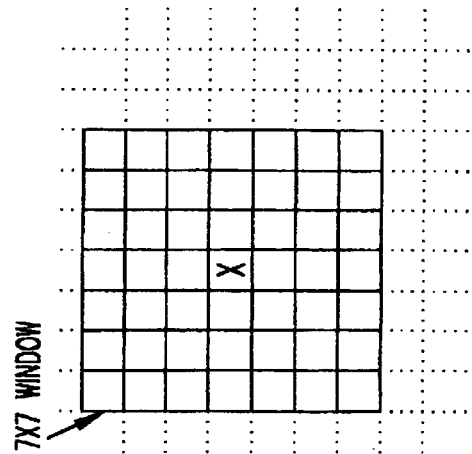
Figure 7C:
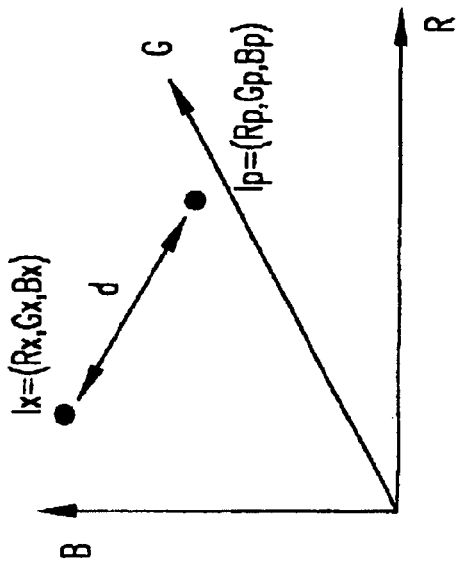
FIG. 7(c) shows how a RGB color space difference is determined between these pixels.
Figure 7B:
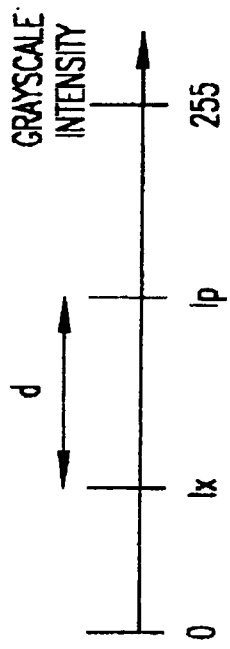
FIG. 7(b) shows an interval between these pixels.
Figure 7A:
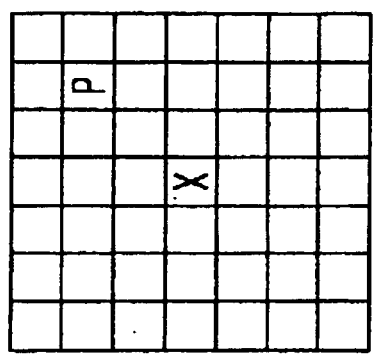
FIG. 7(a) is window showing an unvisited pixel and a center pixel.

FIG. 5(*a*) shows the subsequent order of processing pixels in the original image. An n×m window is moved from one pixel to the next in raster order, as shown in FIGS. 5(*b*) and (*c*). For specificity, a 7×7 window is illustrated in the figure. In the preferred embodiment, the sigma filter then scans the intermediate image $f_1$ using the same sized window. The elements within the n×m window are scanned in the same raster order as shown in FIG. 5(*a*). As the window is scanned, the sigma filter identifies those pixels in the intermediate image, $f_1$ 402, which are within 2σ of the value of the center pixel of the window. Let I denote the interval within 2σ of the value of the center pixel of the window. (For computational efficiency, we assume that the mean value and center pixel value are interchangeable). In the one-dimensional case, involving grayscale images, this interval is represented by a line segment as shown in FIG. 7(*b*). In the three-dimensional case, involving RGB values, this interval is generalized to a sphere centered at the mean.

Figure 6:
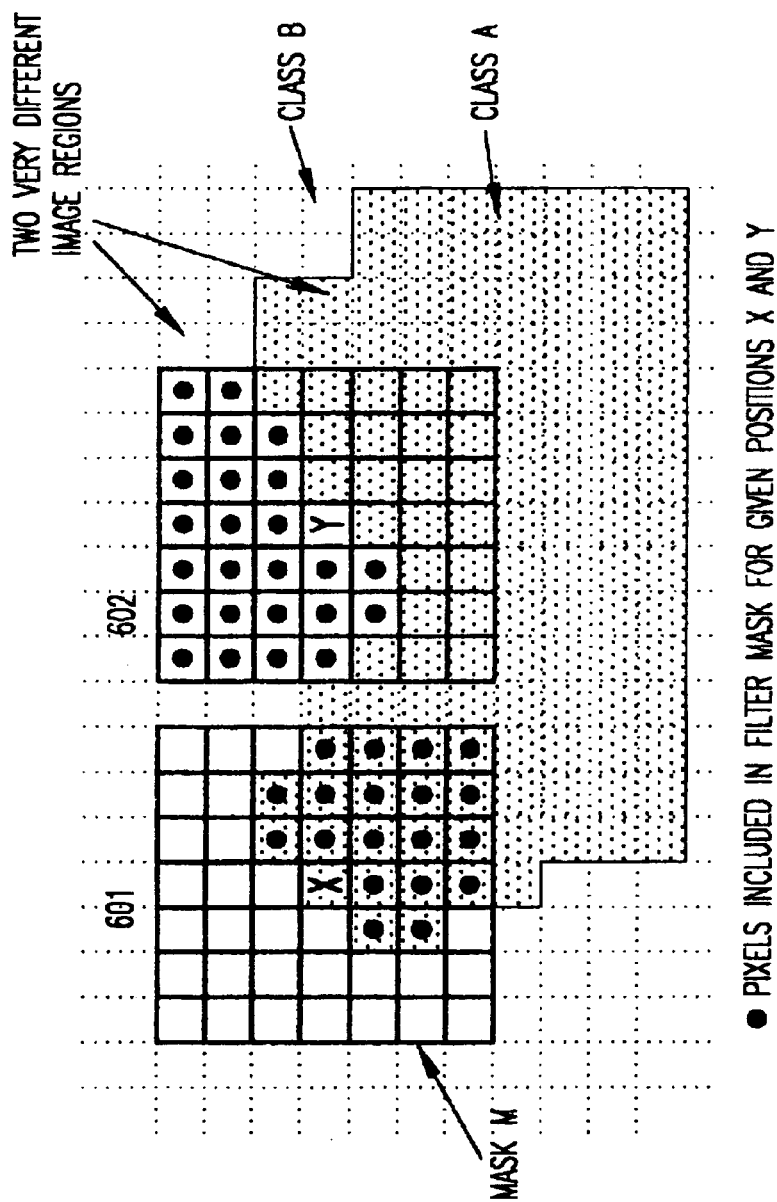
FIG. 6 is a diagram showing two positions of a filter mask used in accordance with the present invention.

The pixels outside of this range (2σ) are considered outliers, and the pixels that are within this range are considered to belong to the same class as the center pixel. This concept is illustrated in FIG. 6, which shows the center pixel of a 7×7 window positioned over regions of different characteristics.

For the sake of simplicity, we consider regions, denoted by class A and class B, which represent regions with widely differing colors. In 601, the center pixel X of the 7×7 window is positioned on a class A pixel. Hence, the sigma filter includes those pixels within the 7×7 window that are in class A, and excludes pixels belonging to class B, which are considered to be outliers. The result of this operation is to produce a mask M, which marks the positions of the pixels of $f_1$ 402, that belong to the same class as the center pixel. These positions are denoted by the black dots in M. Similarly, in 602, the center pixel Y of the 7×7 window is positioned on a class B pixel. Hence, the sigma filter includes those pixels within the 7×7 window that are in class B, and excludes pixels belonging to class A, which are considered to be outliers. The result of this operation is to produce another mask.

The number of non-zero elements in the mask is counted. If this number is less than N=ceil(1.5 σ)+1, then the center pixel is replaced by the mean of its surrounding pixels (say within a 3×3 window) and processing resumes at 490 with the new value for the center pixel. The reason for this step is that the image may contain impulse noise, and few pixels will be close in value to a noisy center pixel. In such a case, the noisy center pixel is replaced as described.

Each element of the mask is then multiplied by the coefficients of a smoothing filter such as a Gaussian function, shown in FIG. 8 to generate a resulting filter kernel. The resulting filter kernel is then applied to pixels of the original halftone image, f, within the given n×m window. The construction of this filter kernel ensures that pixels within similar classes are smoothed, and pixels belonging to disparate classes are ignored. As a result, the sigma filter generates a piecewise-smooth continuous-tone image with preserved edge information.

Color Mixing Considerations

To achieve similarity in perceived color, we review a color mixture model such as the one disclosed in the text, Hunt, "The Reproduction of Colour," 5th edition, Fountain Press, 1995. In accordance with this model, suppose two colors $C_1$ and $C_2$ are mixed in quantities $m_1$ and $m_2$ respectively. The colors may be represented by their chromaticity coordinates as follows:

$$C_1 = r_1 + g_1 + b_1 \quad (2)$$

$$C_2 = r_2 + g_2 + b_2 \quad (3)$$

where $r_i + g_i + b_i = 1$ for $i \in \{1,2\}$. Assume that color descriptions of $C_1$ and $C_2$ possess luminance values $L_1$ and $L_2$. It can be shown that the chromaticity coordinate values of the mixture $C_1$ and $C_2$ obey the center of gravity law as follows:

$$k_{mix} = \frac{\frac{m_1}{L_1} k_1 + \frac{m_2}{L_2} k_2}{\frac{m_1}{L_1} + \frac{m_2}{L_2}} = \frac{w_1 k_1 + w_2 k_2}{w_1 + w_2} \quad (4)$$

where $k \in \{r, g, b\}$. Geometrically, the mixed color lies on the line connecting two original colors in the chromaticity coordinate system.

Even though the color halftone de-screening problem is different from color mixtures, a locally weighted average offers a good approximate color representation of the actual color, which is similar to the equation. It should be noted that this locally weighted average may be valid only when cross-region smoothing is prevented. Otherwise, erroneous colors will be generated at the boundaries of different regions.

Smoothing Filters for De-screening

Returning to the system shown in FIG. 1, low-pass smoothing filter 16 of the invention is preferably constructed to handle different screening frequencies. FIG. 3 demonstrates that undesirable harmonic peaks are distributed isotropically because of the existence of multiple inks at different screening angles. Therefore, an isotropic low-pass filter may be used in the frequency domain. Preferably, a family of Gaussian low-pass filters are used with parameter $\sigma_w$, where this parameter refers to the standard deviation of the Guassian in the frequency domain.

For improved understanding, it is noted that the Fourier transform of a Gaussian function is another Gaussian function, and a Gaussian low-pass filter satisfies the following uncertainty principle:

$$\sigma_g \sigma_w = 1 \quad (5)$$

where $\sigma_g$ and $\sigma_w$ are standard deviations of the Gaussian low-pass filter in the spatial and frequency domains, respectively. In constructing the low-pass filter of the present invention, the location of the maximum harmonic component in the spatial frequency domain, denoted as $(w_x, w_y)$, is first identified. If $$\hat{\sigma}_w = \|(w_x, w_y)\|$$

denotes the estimate of the standard deviation of the desired Gaussian in the frequency domain, then a Gaussian low-pass filter in the spatial domain may be chosen with a parameter $$\sigma_g = \left\lceil \frac{1}{\hat{\sigma}_w} \right\rceil$$

for which the frequency response is small for $$\|\hat{w}\| \geq \sigma_w$$

For the first stage of the two-stage filtering operation, a low-pass filter is used which is a Gaussian filter preferably having a window size of 2(ceil(1.5σ))+1. This filter is appropriate for error-diffused halftones, stochastically screened halftones, and color halftones where is no preferred direction.

With the foregoing in mind, FIG. 4 shows steps included in a preferred embodiment of the method of the present invention. An initial step of the method includes obtaining a halftone image f which may be a gray-scale or color halftone image. The threshold value δ which the filters will use to smooth the input image (Block 401) is then determined as previously described (Block 420), followed by the computation of parameters for the low-pass and signal filters (Block 403). The size of the Gaussian low-pass filter and its coefficients in the spatial domain depend on a parameter $\sigma_g$ which is the standard deviation of the Guassian. This Parameter $\sigma_g$ is computed by first identifying the location of the maximum harmonic component in the spatial frequency domain, denoted as ($w_x$, $w_y$). The value $$\hat{\sigma}_w = \|(w_x, w_y)\|$$

is then computed as an estimate of the screen frequency in the frequency domain. Finally, $\sigma_g$ is computed as $$\sigma_g = \left\lceil \frac{1}{\hat{\sigma}_w} \right\rceil$$

Once these values are determined, the halftone image is input into the two-stage filter of the invention. (See Block 15 in FIG. 1).

Operation of the Two-stage Sigma Filter

The two-stage filter de-screens the image by first convolving the image with the low-pass filter to generate an intermediate smoothed image. (Block 402). This step is performed by scanning the n×m window over the halftone image in the manner previously described. In performing this step, it is preferable to use a Gaussian low-pass filter applied with standard deviation σ as defined above and a window size 2 ceil(1.5 σ)+1. The intermediate smoothed (i.e., low-pass filtered) image may be denoted as $$f_1(x, y)$$

This completes the smoothing filter operation at 16 in FIG. 1, which is the same as Block 402 in FIG. 4. The remainder of FIG. 4 (i.e., Blocks 430–470), constitute a detailed description of Block 17 of FIG. 1. An n×m window is selected in f and f in Block 430.

After the halftone image is processed with the first window, the next window in the scanning process is selected. This window is applied both in the original halftone image f and the intermediate smoothed image $f_1$. (Block 430). The method continues by computing the distance, d, from the center pixel in the window in image $f_1$ to a next unvisited pixel, p. (Block 440). This distance is measured in terms of an RGB color space difference between the unvisited pixel and the center pixel within the window, as shown in FIG. 7.

In the next step, it is determined whether the computed distance d is greater than the threshold value (2σ). (Block 445). If not, the pixel position of the unvisited pixel p is included in a filter mask, M. (Block 450). The filter mask M has a value of "1" to mark an included pixel and "0" otherwise.

The last step in processing the window W is to check whether the number of nonzero mask elements is less than N. (Block 460). If so, the center pixel color value is replaced with an average of the surrounding pixels in the window and a new mask M is generated with the new value of the center pixel.

After any required modification performed in Block 460, the masked version of the original halftone image f is convolved with the smoothing filter to generate the pixel in the output image $f_o$. (Block 470). After the convolution step in Block 470 is performed, the method determines whether the de-screening process is finished. (Block 435). If not, the next pixel in raster order is processed using an n×m window. (Block 430).

After all the pixels in the input image are processed, the image output device outputs a continuous-tone (inverse halftone) image from the sigma filter. (Blocks 435 and 436).

Comparison with Conventional Designs

Since this invention uses a sigma filter, a comparison is now made between the use of such a filter in conventional systems and the use of such a filter in accordance with the present invention. We assume that an image is modeled as f(x,y)+n(x,y), where f(x,y) represents clean image data and n(x,y) corresponds to a noise component of the image. The parameters of the filter are then determined to enable processing of the image, first, by defining a window which is n×m pixels in size and, second, by scanning this window (e.g., in raster fashion) throughout the image, as shown in FIG. 5 (*a*). The image intensity values for pixels within the window are preferably modeled as a summation of a constant, k, and the noise component n(x,y). (For the time being, we assume that the window does not contain edges, or sharp transitions). We can approximate noise as a Gaussian distribution, which is completely characterized by its mean, μ, and standard deviation σ. It can be shown that, for a Gaussian distribution, 95% of the population is located within 2σ of the mean. This implies that 95% of the pixel values (e.g., a color value in terms of a RGB space) in the window are located within 2σ of the mean, μ. The "mean" refers to the average of the color values of the pixels in the window. In this invention, we present specific techniques for estimating the mean and filter parameter σ.

Let I denote the interval within 2σ of the mean. In the one-dimensional case, involving grayscale images, this interval is represented by a line segment as shown in FIG. 7(*b*). In the three-dimensional case, involving RGB values, this interval is generalized to a sphere centered at the mean.

After the sigma filter parameters are determined, pixels in the original image are processed as shown in FIG. 5(*a*). An n×m window is moved from one pixel to the next in raster order, as shown in FIGS. 5(*b*) and (*c*). For specificity, a 7×7 window is illustrated in the figure. As the window is scanned, the sigma filter identifies those pixels in the image, which are within 2σ of the value of the center pixel of the window. The pixels outside of this range (2σ) are considered outliers, and the pixels that are within this range are considered to belong to the same class as the center pixel. This concept is illustrated in FIG. 6, which shows the center pixel of a 7×7 window positioned over regions of different characteristics. For the sake of simplicity, we consider regions, denoted by class A and class B, which represent regions with widely differing colors. In 601, the center pixel X of the 7×7 window is positioned on a class A pixel. Hence, the sigma filter includes those pixels within the 7×7 window that are in class A, and excludes pixels belonging to class B, which are considered to be outliers. The result of this operation is to produce a mask M, which marks the positions of the pixels of $f_1$, 402, that belong to the same class as the center pixel. These positions are denoted by the black dots in M, and are given the value '1'. Similarly, in 602, the center pixel Y of the 7×7 window is positioned on a class B pixel. Hence, the sigma filter includes those pixels within the 7×7 window that are in class B, and excludes pixels belonging to class A, which are considered to be outliers. The result of this operation is to produce the mask for position Y.

An element of mask M can contain one of two values, 0 or 1, with a '1' denoting an element that belongs to the same class as the center pixel, and '0' denoting an element that belongs to a different class. Each element of the mask is then multiplied by the coefficients of a smoothing filter such as a Gaussian, shown in FIG. 8 to generate a resulting filter kernel. The resulting filter kernel is then applied to pixels of f within the given n×m window. The construction of this filter kernel ensures that pixels within similar classes are smoothed, and pixels belonging to disparate classes are ignored. As a result, the sigma filter generates a piecewise-smooth continuous-tone image with preserved edge information.

Though a sigma filter has the above-mentioned desirable properties, simply applying a conventional sigma filter to de-screen halftone images will not work, as the sigma filter will preserve the discontinuities arising from halftone dots. In other words, if the image f corresponds to a halftoned image, applying the conventional signal filter as described above will not work. To illustrate this effect, imagine a window sliding through a constant gray-scale halftone image which is composed of approximately bi-level dot patterns with nominal values of 255 and 0. Assume the value of the center pixel is 255. Applying the conventional sigma filter (such as disclosed in Lee, "Direct Image Smoothing and the Sigma Filter," CVGIP, Volume 24, pages 255–269, 1983) would select pixels with values close to 255. The weighted average will also be close to 255. A similar situation occurs when the value of the center pixel is zero. Hence, most of the halftone pattern will still exist after filtering. This is why the first stage in the two-stage signal filter of the present invention involves the application of a low-pass smoothing filter.

By using the two-stage filter described herein, the present invention is a system and method which converts a halftone image into a continuous-tone image with improved quality compared with conventional methods, and more specifically in a way that achieves at least four objectives: 1) eliminating periodic signals corresponding to the screen in the original halftone image, 2) preserving inherent edge information, 3) remaining visually appealing, and 4) preserving the perceptual color for color images. Conventional de-screening systems and methods do not achieve all of these advantages at once, especially the first two objectives because they are in conflict with one another.

To satisfy the first objective, the smoothing filter is preferably a low-pass filter. Blindly applying a low-pass filter, however, will inevitably blur the de-screened (continuous-tone) image. This, in turn, destroys inherent edge information, which is the second objective.

The present invention represents a significant improvement over conventional systems and methods because it achieves both objectives, i.e., it eliminates periodic signals corresponding to the screen in the original halftone image while simultaneously preserving inherent edge information. This solution is achieved based on the use of a two-stage color sigma filter to de-screen color images. More specifically a sigma filter is combined with a smoothing (e.g., a low-pass) filter to generate de-screened images which appear piecewise smooth with preserved edges.

A number of advantages are obtained with this arrangement compared with conventional systems. Desirably, the two-stage sigma filter of the invention processes an image into piecewise smooth regions while still preserving edges, similar to the anisotropic diffusion and total variation approaches. Also, its computational complexity is O(N), where N is the number of pixels in the image.

Further, this two-stage sigma filter of the invention advantageously demonstrates an efficiency at least equal to that of a median filter. Still further, the kernel function of the sigma filter may be modified to make images visually more attractive than conventional approaches.

In terms of universal appeal, the method of the present invention is applicable to any inverse halftoning process, as well as gray scale and color halftone images, because no assumption is made regarding the halftone process used.

When combined with halftone segmentation techniques, a complete document processing algorithm for gray-scale and color documents may advantageously be created. Automatic zoning and descreening enable documents to be scanned and converted to digital formats with no or little human intervention. The automatic zoning or segmentation identifies halftoned and text areas with the document. The text areas may be subsequently processed by OCR techniques. The halftoned areas are descreened using the techniques described in this invention. This greatly speeds up the conversion process enabling a higher volume of material to be digitized at lower cost. This material finds its way into products like books-on-demand and e-books.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A method for converting halftone images into continuous-tone images, comprising:
    obtaining a halftone image;
    defining a two-stage filter, wherein a first stage is a smoothing filter and a second stage is a sigma filter connected to the smoothing filter;
    defining parameters for the smoothing filter and the sigma filter, which includes an intensity difference delta;
    inputting the halftone image into a smoothing filter to derive an intermediate image;
    sweeping a window across said halftone image and the corresponding intermediate image, and within a window, selecting those pixels that have an intermediate gray value within said intensity difference delta of a center window pixel;
    applying a sigma filter to pixels from said halftone image that correspond to pixels selected in said sweeping step; and
    outputting from said sigma filter a continuous-tone image which is piecewise-smooth and has preserved edges.

2. The method of claim 1, wherein said smoothing filter is a low-pass filter.

3. The method of claim 2, wherein said low-pass filter includes a plurality of Gaussian low-pass filters.

4. The method of claim 1, further comprising:
    printing said continuous-tone image.

5. The method of claim 1, wherein said halftone image is a color image.

6. The method of claim 1, wherein said halftone image is a gray-scale image.

7. The method of claim 1, wherein said smoothing filter is an isotropic low-pass filter.

8. The method of claim 1, wherein said intensity difference delta is determined by computing a set of edge pixels from said intermediate image and selecting those pixels that fall within a given spatial distance from said set of edge pixels to form a second set, and computing a standard deviation of the gray values of the pixels in the second set, and setting delta to be a multiple of said standard deviation.

9. The method of claim 8 wherein the multiple is 2.

* * * * *